(12) United States Patent
Li et al.

(10) Patent No.: US 8,255,698 B2
(45) Date of Patent: Aug. 28, 2012

(54) CONTEXT AWARE BIOMETRIC AUTHENTICATION

(75) Inventors: Yuk L. Li, Colonia, NJ (US); Padmaja Ramadas, Davie, FL (US)

(73) Assignee: Motorola Mobility LLC, Libertyville, IL (US)

( * ) Notice: Subject to any disclaimer, the term of this patent is extended or adjusted under 35 U.S.C. 154(b) by 895 days.

(21) Appl. No.: 12/343,060

(22) Filed: Dec. 23, 2008

(65) Prior Publication Data

US 2010/0162386 A1   Jun. 24, 2010

(51) Int. Cl.
*G06F 21/00* (2006.01)

(52) U.S. Cl. ............ 713/186; 705/51; 705/52; 709/229; 709/238; 455/433; 455/455

(58) Field of Classification Search .................. 713/186
See application file for complete search history.

(56) References Cited

U.S. PATENT DOCUMENTS

| | | | |
|---|---|---|---|
| 7,184,579 B2 | 2/2007 | Mizoguchi | |
| 7,319,987 B1 | 1/2008 | Hoffman | |
| 2006/0064380 A1 | 3/2006 | Zukerman | |
| 2006/0293891 A1* | 12/2006 | Pathuel | 704/246 |

FOREIGN PATENT DOCUMENTS

| | | | |
|---|---|---|---|
| KR | 2007099775 A | * | 10/2007 |
| WO | WO2006031923 A2 | | 3/2006 |
| WO | WO2008022157 A2 | | 2/2008 |

OTHER PUBLICATIONS

Sources of Error in Iris Biometrics|http://nd.edu/~flynn/papers/KarenHollingsworthThesis.pdf|Karen P. Hollingsworth|pp. 1-98|Apr. 2008.*
Hulsebosch, et al. "Enhancing Face Recognition With Location Information", The Third International Conference on Availability, Reliability and Security, 0-7695-3102-4/08, 2008 IEEE.
Bardram, Jakob E., "The Trouble With Login: On Usability and Computer Security in Ubiquitous Computing", Published Online Jul. 23, 2005.

* cited by examiner

*Primary Examiner* — Taghi Arani
*Assistant Examiner* — Mahfuzur Rahman (57) ABSTRACT

A biometric sample of the user is received at a biometric interface of a device as part of a biometric authentication request by the user, with the biometric sample characterized by a match score when the biometric sample matches at least one stored template that uniquely identifies the user. The presence of a context usage override condition of the biometric authentication request causes a context usage factor to be updated based upon the context usage override condition. A biometric recognition threshold required for the user to access the application and indicative of a threshold security level required for biometric authentication is calculated based on the context usage factor. The user is permitted to access the application when the match score of the biometric sample is at least equal to the biometric recognition threshold.

12 Claims, 6 Drawing Sheets

CONTEXT AWARE BIOMETRIC AUTHENTICATION

CROSS-REFERENCE TO RELATED APPLICATIONS

The present application is related to U.S. application Ser. No. 12/342,621, filed Feb. 23, 2008, titled "BIOMETRIC AUTHENTICATION BASED UPON USAGE HISTORY", Li, et al.

TECHNICAL FIELD

The technical field relates generally to biometrics and more particularly to the security threshold required for user biometric authentication.

BACKGROUND

For devices having a biometric sensor security capability, the ability to determine whether a match of sufficient quality has been obtained between a biometric sample provided by a user and a user template is important. The accuracy of the biometric sensor, which may be affected by such factors as the placement of the sensor and the way in which a user interacts with the sensor to provide biometric samples, as well as the quality of the algorithms used to manage the biometric authentication process are considerations for quality biometric authentication.

In traditional biometric systems, the threshold security levels required to access an application, often reflected in the false acceptance rate (FAR) and false rejection rate (FRR) associated with a given security level, are often static and not responsive to the context in which an authentication request is made or the usage context by the user. The threshold, for example, may be determined by the sensor vendor that justifies the static threshold security setting with user accuracy test results. The security threshold may be determined by a registry setting on the device or set by the application requesting authentication via an application programming interface (API). There is currently no attempt to dynamically vary the threshold based on contextual information related to an authentication request by a user of the device.

Thus, there exists a need for biometric authentication in which the security threshold required for access to one or more applications is dynamically controlled in response to context.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, customized biometric authentication for a user in which the security level of the biometric authentication is dynamically set is provided. The security level is dynamically set based at least in part on the presence of one or more context usage override conditions associated with an authentication request by the user for a particular application. A biometric sample of the user is received at a biometric interface of a device as part of a biometric authentication request by the user, wherein the biometric sample is provided by the user in an attempt to access an application, and wherein the biometric sample is characterized by a match score when the biometric sample matches at least one stored template that uniquely identifies the user. The presence of a context usage override condition of the biometric authentication request is detected and a context usage factor is updated based upon the context usage override condition. A biometric recognition threshold required for the user to access the application and indicative of a threshold security level required for biometric authentication is calculated based on the context usage factor. The user is permitted to access the application when the match score of the biometric sample is at least equal to the biometric recognition threshold. Those skilled in the art will realize that the above recognized advantages and other advantages described herein are merely illustrative and are not meant to be a complete rendering of all of the advantages of the various embodiments.

Figure 1:
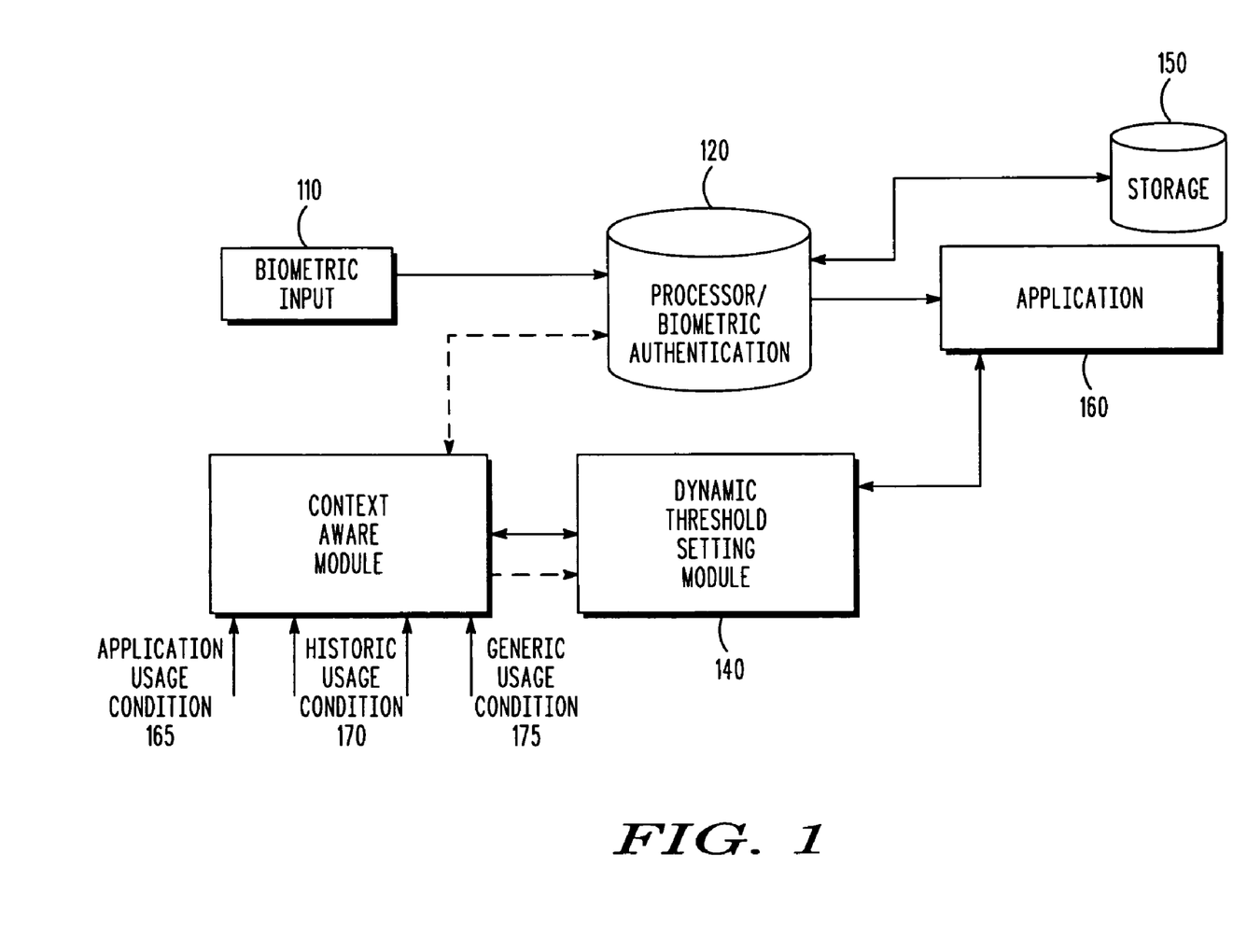
FIG. 1 is a functional diagram illustrating architecture of a device capable of context aware biometric authentication, in accordance with various embodiments.

Referring now to the drawings, and in particular FIG. 1, a functional diagram illustrating architecture of a device 100 operable in a system having a biometric authentication that can be dynamically set, in accordance with various embodiments, is shown. Those skilled in the art, however, will recognize and appreciate that the specifics of this example are merely illustrative of some embodiments and that the teachings set forth herein are applicable in a variety of alternative settings. Other alternative implementations are contemplated and are within the scope of the various teachings described.

In FIG. 1, device 100 is a device capable of biometric authentication of a biometric sample presented by a user of the device. The device comprises a biometric input 110, a processor 120 for biometric authentication, a context aware module 130, a dynamic threshold setting module 140, a storage element 150, and an application 160, the access to which is controlled by a biometric authentication process in accordance with the teachings herein. Modules 130 and 140 represent functional blocks performed in a processor that could be the same as processor 120 or a separate processor within or external to the device 100. The device may be a cellular telephone, a personal digital assistant (PDA), a radio, a laptop computer or other mobile devices, as well as a personal computer (PC), server or enterprise server, having these functional elements. The biometric sample may be a fingerprint sample, an iris or retinal scan, etc., used to identify biometric characteristics unique to a user. If the biometric sample is a fingerprint sample, the sample may be fingerprint swipe or a fingerprint scan provided by the user at the biometric interface 110.

Figure 4:
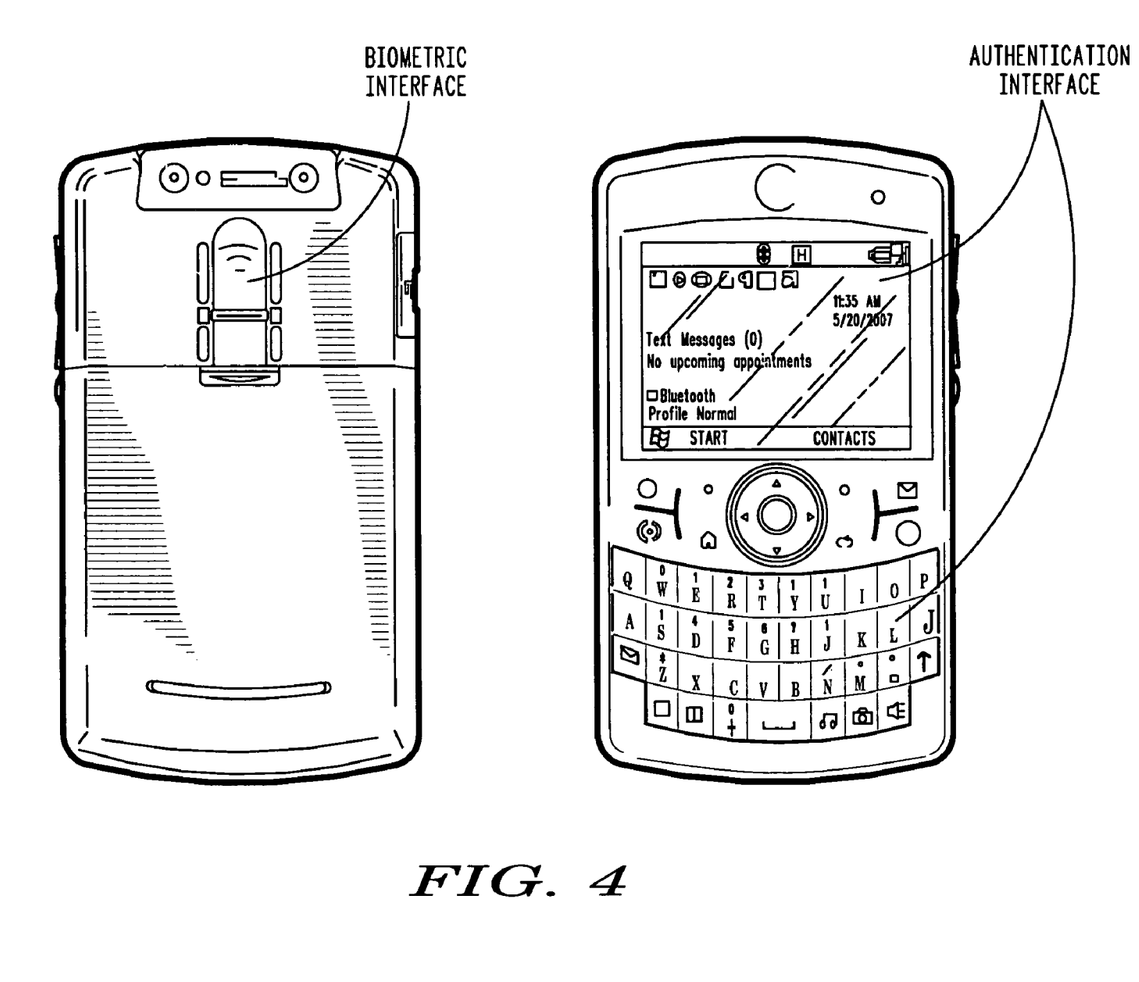
FIG. 4 illustrates a biometric interface and an authentication interface of a device, in accordance with various embodiments

The biometric interface 110 has a biometric sensor capable of receiving a biometric sample of the user in a biometric authentication request by the user in an attempt to access an application (such as application 160) via the device. The biometric sample is characterized by a match score when the biometric sample matches at least one stored template that uniquely identifies the user; the biometric sample may be a fingerprint (in which case the biometric interface is a fingerprint sensor), an iris scan, or other biometric samples that uniquely identifies the user. The stored template(s) may be stored in storage element 150, which may reside on the device, at a terminal, a server, or on a biometric authentication system. The biometric interface 110 is in operational communication with the processor that performs biometric authentication 120. An example of a biometric interface 110 is shown by the fingerprint sensor in FIG. 4, which also illustrates a display and keyboard suitable for communicating with the user as an authentication interface.

In communication with processor 120, there is context aware module 130, which is an algorithm or software module capable of detecting one or more context usage override conditions associated with the biometric authentication request. These context usage override conditions may be one or more of an application usage override condition 165, an historical usage override condition 170, or a generic usage override condition 175, as shown. These conditions are provided to processor 120 as well as to dynamic threshold setting module 140, which is an algorithm or software module that updates a context usage factor based upon these one or more context usage override conditions and calculates a dynamic recognition threshold required for the user to access the application based on the context usage factor; the dynamic recognition threshold determines a threshold security level required for biometric authentication of the user. This calculated biometric recognition threshold is communicated by the dynamic threshold setting module 140 to processor 120 and optionally also to the application 160 the user is attempting to access. The application may reside on the device itself, at a terminal, on a server, or otherwise on a biometric authentication system, in which case it may be accessed remotely, such as over the world wide web or Internet. The application 160 may be one of several applications available to the user via an authentication process.

The biometric recognition threshold, then, is capable of being dynamically or adaptively set based on the context in which the authentication request was made. Context includes generic context, application specific context, and historic usage data. A default biometric recognition threshold is dynamically tuned to reflect one or more of these context usage conditions. It is considered that the default biometric recognition threshold is dynamically tuned to reflect generic and/or historical usage and that tuned or updated biometric recognition threshold may be further adapted to reflect application specific context.

Consider a generic usage override condition. Examples of generic usage override condition include a location based condition, a time of day condition, a humidity condition, an ambient light condition, a temperature condition or a motion condition caused by usage of the device, as mentioned above. With regard to a location condition, the calculated biometric recognition threshold may be dependent upon the location in which the user uses the device to access the application. If the device has location based services support (through GPS, WiFi triangulation, cellular triangulation, or the like), this information can be used to determine the security level required to access the application. A back end policy server, or a limited version running on the device, containing relevant location information, can be used to determine the security policy. For example, if the location is a local fast food place, the security level can be set lower. If the location is a high class restaurant, the security can be set higher. Or, with regard to a time of day condition, the calculated biometric recognition threshold may be dependent upon the time of day that the user uses the device to access the application. Furthermore, consider that motion and environmental (e.g. humidity and temperature) conditions can also affect the biometric recognition threshold needed.

Consider the following example, in which a user is detected using the device to pay a transit fare from a near field communication (NFC) terminal at a location in a metro station. The ambient light sensor may detect that the user is underground, and the motion sensor senses quick motions corresponding to the authentication swipe by the user, which may be of poor quality because the user is in a hurry to catch the train. In this specific example, the application may choose to override the default security setting and lower the biometric recognition threshold to allow for better user experience. Setting the biometric recognition threshold lower in this case will allow a lower FRR to be acceptable, resulting in less user frustration that might otherwise result from the poor fingerprint swipe. In this example, the subway payment can be identified from the NFC terminal, the user motion, and the location.

An application specific usage override condition may include a terminal location, a facility in which the terminal is housed, an amount of a financial transaction that affects the biometric recognition threshold, and/or application specific parameters, like a user account type, a user account balance, a transaction type, or a recent activity parameter. It is noted that a terminal may be the device from which the user attempts to access one or more applications.

Consider the following description of the terminal at which the user may attempt access of an application. For the NFC terminal using a short-range wireless communication technology and offering contactless payment to the user, the terminal can define the security required, which may be based on the location of the terminal, the type of facility the terminal is located in, or the amount of the transaction. The terminal can request the security required from a back end policy server, discussed below, with which it communicates.

Another example of an application specific usage override condition has to do with the price or amount of a transaction.

The security level required to access the application may simply be based on the amount of the transaction. In this case, generally the lower the amount, the lower the relative security level required. The decision can be made by the application on the device, the terminal, or a back end policy server.

It is noted that a policy server or authentication server operating in tandem with the device can provide security requirements based on relevant information. Such information may include a user account type, user account balance; information from the application server such as type of transaction, credit card or debit card transaction, amount of the transaction, recent activities such as fraudulent transaction, very recent frequent and/or large transactions. A back end policy server can provide the definition for security policy based on such relevant information. The policy server can communicate the information to a terminal, in the case of terminal-defined security, directly to the device, or through the application server handling the transaction. Moreover, an authentication server can be used for authentication and policy definition. In this configuration, the biometric sample, such as a finger swipe, may be encrypted and transmitted to the authentication server. The authentication server can perform the authentication (print match) and based on relevant information, decide if the match score provides sufficient security.

A historical usage override condition may be an updated false reject ratio (FRR) for the last N matches of a plurality of biometric samples supplied by the user. As will be described further in the biometric authentication described in conjunction with FIGS. 3-6 below, the biometric sample of the user received at the biometric interface is compared with the at least one stored template of the user and a match score generated when the biometric sample matches the stored template. The match score is compared to a match score threshold value of the application that the user is attempting to access to generate match score comparison results, and the updated false reject ratio (FRR) for the last N matches of the user is calculated. The user is permitted to access the application when the match score comparison results indicate that the match score is at least equal to the match score threshold value and the updated FRR is less than a FRR threshold value of the application.

Consider as an example a user, who historically never uses the device from midnight until 6 am while asleep, at home where the biometric recognition threshold is low for this location. An attempt to use the device to access an application at 3 am is a historical override usage condition that is contrary to historical usage by the user and could result in the biometric recognition threshold being raised.

Consider further the following ebanking applications with epayment feature. The application may have a default security level regardless of what the purchase is. However, in accordance with the teachings herein, if the payment amount is small, such as lunch at a fast food restaurant or contactless payment for subway fare, the default biometric security level can be dynamically set lower. In the case of a subway payment at an NFC terminal, the user may be in a rush to catch the train and may not provide a good biometric sample, a fingerprint swipe, for example. Conversely, if the purchase is for an expensive diamond ring, the biometric recognition security level should be set higher for a lower FAR. This will help protect the user from fraudulent activities.

Figure 2:
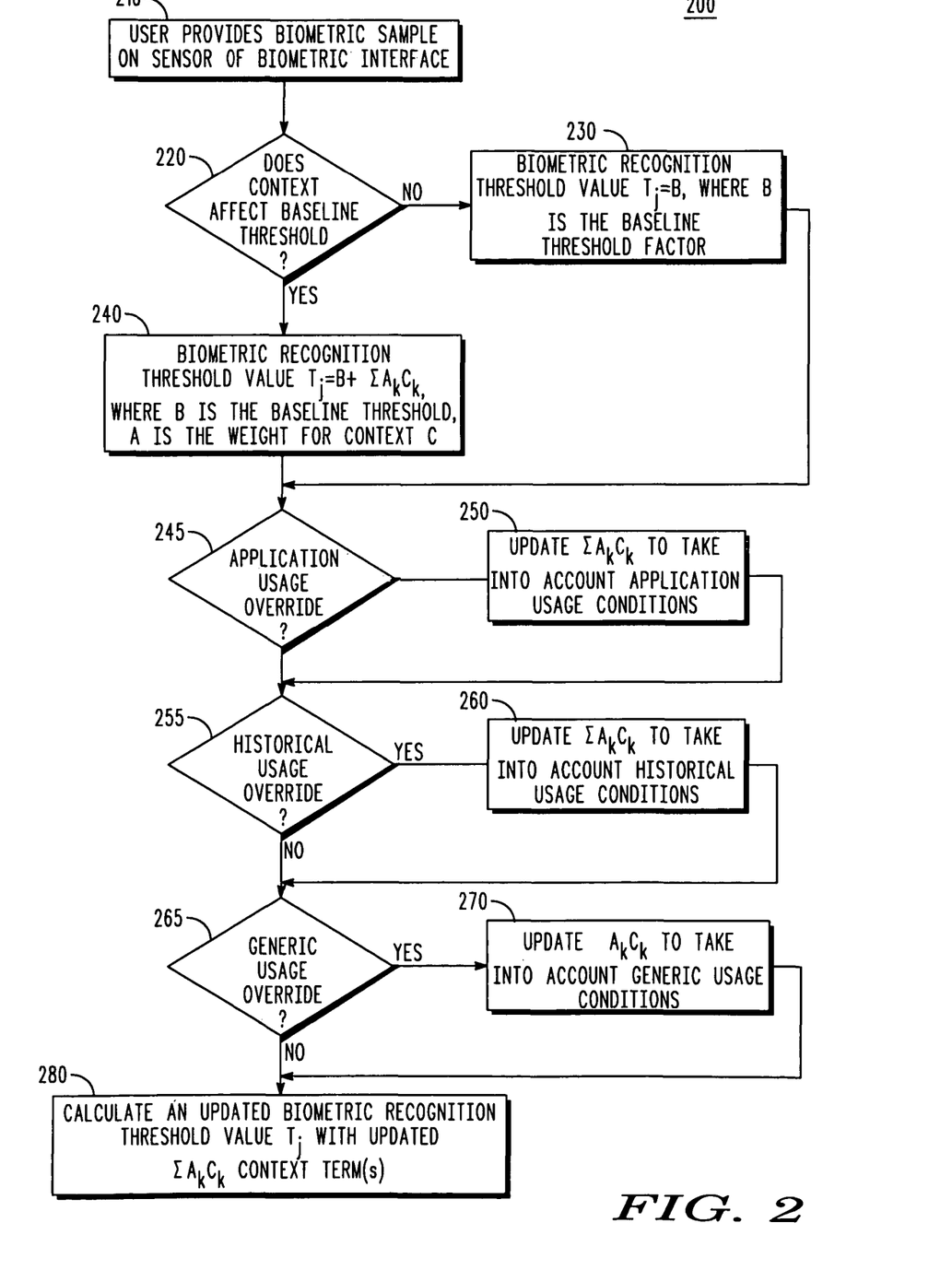
FIG. 2 is a flow diagram illustrating a method of dynamically setting the security level of biometric authentication, in accordance with various embodiments.

Referring now to flow diagram 200 of FIG. 2, at Block 210, a user provides a biometric sample at or on a sensor of a biometric interface in an attempt by the user to access an application; if the biometric sample matches at lease one template unique to the user, then the biometric sample is characterized by a match store. At Decision Block 220, the inquiry is whether context will affect the baseline threshold in setting the security level of biometric authentication. If no, then the biometric recognition threshold value required for biometric authentication of the user for the application is dependent upon a base threshold factor B. In the flow, the biometric recognition threshold value is given as Tj, a match threshold value, equal to the base threshold factor B at Block 230. If yes, then the biometric recognition threshold value required for biometric authentication of the user for the application is dependent upon at least a context usage factor, given as $\Sigma A_k C_k$, where $A_k$ refers to the weighting for a context $C_k$ for application k; the context usage factor $C_k$ may be unweighted in which case $A_k$ is unity. The biometric recognition threshold may be a match threshold value $Tj = B + \Sigma A_k C_k$, shown at Block 240. Decision Blocks 245, 255, 265 inquire as to the presence of one or more context usage override conditions, described above. The order in which the inquiries of these blocks may be performed is not set, as indeed whether each of them will be performed is optional in the flow diagram. The presence of any one or multiple context usage override conditions may be used to update one or more corresponding context usage factor discussed above, as $\Sigma A_k C_k$; then an updated biometric recognition threshold value Tj is calculated at Block 280 with the updated as $\Sigma A_k C_k$ context terms from Blocks 250, 260, and/or 270.

Returning again to the context usage override conditions, at Decision Block 245, the inquiry concerns the presence of one or more application usage override conditions. If such conditions are present, then Block 250 updates one or more context usage factor(s) corresponding to these application usage conditions. As previously described, examples of application usage override conditions include a terminal location, a facility in which the terminal is housed, an amount of a financial transaction that affects the biometric recognition threshold, and/or application specific parameters, like a user account type, a user account balance, a transaction type, or a recent activity parameter.

At Decision Block 255, the inquiry is whether there are any historical usage override conditions. If yes, then at Block 260 the context usage factor(s) $\Sigma A_k C_k$ is updated to take into account these historical usage override conditions. A historical usage override condition is a pattern of usage by the user. The historical usage override condition could be an updated FRR of the previous N biometric samples provided by the user. Moreover, a historical usage override condition could refer to when or even where a user historically makes a transaction. Consider again the example a user who usually never uses the device from midnight until 6 am while asleep. During this time, an attempt to use the device to access an application at 3 am would be a historical override usage condition contrary to historical usage by the user that would result in the biometric recognition threshold being raised. Or, consider the case where the user historically only uses the device to access an application in the Washington, D.C. area; attempted use of the device in California, then, would be a historical usage override condition that would demand a higher security setting. As previously described, a historical usage override condition may be used to override a generic usage override condition that is otherwise a default condition of the application, in which case the historical usage override condition is weighted more heavily than the generic usage override condition.

At Decision Block 265, the inquiry is whether there are any generic usage override conditions. If yes, then at Block 270 the context usage factor(s) $\Sigma A_k C_k$ is updated to take into account these generic usage override conditions. As previously described, examples of generic usage override condition include a location based condition, a time of day condition, a humidity condition, an ambient light condition, a temperature condition or a user motion of usage of the device, as mentioned above.

With regard to when the historical usage override context condition is an updated false reject ratio (FRR) for the last N matches of a plurality of biometric samples supplied by the user, consider the following taken together with the description of FIGS. 3-6.

For devices with biometric security capability, the accuracy of the sensor, defined by false accept ration (FAR) and false reject ratio (FRR), and supporting authentication algorithms is a concern. Of particular concern is training the user on proper mechanics of biometric sampling and the effect that such training has on the accuracy of the biometric authentication process as well as on the user experience.

In a study undertaken by applicants with an ergonomically designed fingerprint sensor system and with extensive user training on proper biometric fingerprint sampling, it was found that the accuracy of the device system was FRR=3.6% at an FAR=0.001%. By eliminating inconsistent user presentation of the biometric samples, such as bad fingerprint swipes even after user training on proper swipe techniques, accuracy improved to FRR=1.26% (FAR=0.001%. The accuracy of different sample mechanics was explored. It was found for example that the user performed very poor fingerprint swipes if no instructions were provided for proper sensor swipe techniques. It was additionally found that a "blind swipe" sample, in which the user cannot see the sensor itself, is of inferior quality to a "visual swipe" sample and is thus more difficult for the user to provide, for example. It was noted, however, that the user became extensively frustrated by the training process and that the achievable accuracy level was dependent on the user's experience with biometric authentication. Some users took longer to learn and some took less time. Moreover, it was discovered that the characteristics of the user, such as the size of the hand, large vs. mall, also impacted the learning process and effectiveness.

With a well-designed, ergonomic system and with limited user training, most users will take time to learn the correct swipe mechanics to provide acceptable performance for biometric authentication. Many users will initially perform poor swipes, causing high failure rates (FRR) of more than 10%. This, unfortunately, results in user frustration that causes some users to forgo the biometric feature altogether. User frustration will be even greater in applications typically requiring higher levels of security and thus higher accuracy in the biometric authentication process, such as banking, e-commerce and financial transactions.

The matching algorithm of a biometric authentication feature has a match threshold that can be set. The threshold can be set depending on the appropriate FRR and FAR for a particular application. Lowering the threshold results in a lower FRR that is more tolerant of bad biometric samples, such as from bad fingerprint swipes, but also results in a higher FAR that provides less security against imposter matches. Usually because of user frustration level, the match threshold is set to the lowest acceptable threshold. However, such a low threshold may not be sufficient for high security applications such as financial transactions and government applications.

Figure 3:
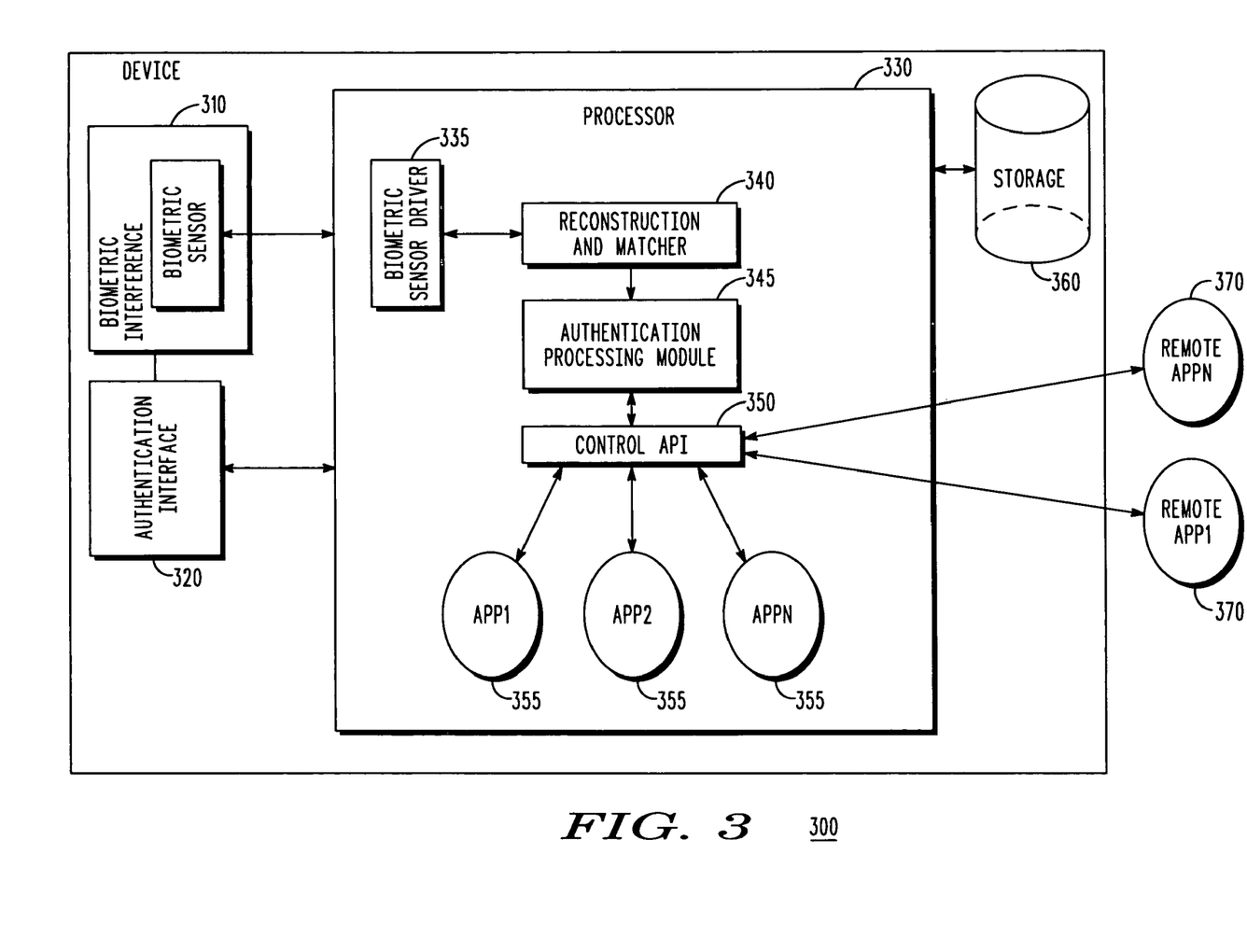
FIG. 3 is a functional diagram of a device capable of biometric authentication, in accordance with various embodiments.

Referring now to the drawings, and in particular FIG. 3, a functional block diagram of a device 300, in accordance with some embodiments is shown. Those skilled in the art, however, will recognize and appreciate that the specifics of this example are merely illustrative of some embodiments and that the teachings set forth herein are applicable in a variety of alternative settings. Other alternative implementations are contemplated and are within the scope of the various teachings described.

In FIG. 3, device 300 has a biometric interface 310, authentication interface 320, processor 330, and storage element 360. Device 300 is capable of biometric authentication of a biometric sample presented by a user of the device. As previously mentioned, the device may be, for instance, a cellular telephone, a personal digital assistant (PDA), a radio, a laptop computer or other mobile devices, as well as a personal computer (PC), server or enterprise server, having these functional elements. The biometric sample may be a fingerprint sample, an iris or retinal scan, etc., used to identify a biometric characteristic unique to a user. If the biometric sample is a fingerprint sample, the sample may be fingerprint swipe or a fingerprint scan provided by the user at the biometric interface 310.

The biometric interface 310 has a biometric sensor capable of receiving a biometric sample of the user; the biometric sample may be a fingerprint (in which case the biometric interface is a fingerprint sensor), an iris scan, or other biometric samples that uniquely identify the user. The biometric interface 310 is in operational communication with the processor 330, as is authentication interface 320, which is operable to interface with the user. An example of a biometric interface 310 is shown by the fingerprint sensor in FIG. 4, which also illustrates a display and keyboard suitable for communicating with the user as an authentication interface.

Within processor 330 is biometric sensor driver 335 operable to receive the biometric sample provided by the user. Biometric sensor driver 335 is in communication with reconstruction and matcher element 340, which receives the biometric scan or image of the biometric sample and attempts to match it with at least one template unique to the user that is stored in storage element 360. While storage element 360 appears to reside within device 300 it is understood and envisioned that templates may also be stored remotely from the device and downloaded as needed. Such might be the case, for example, where one or more biometric templates associated with the user are stored on the Internet at a website associated with an application the user wishes to use. The application or program may be a security feature such as paypass, password, login or the like. Reconstruction and matcher element 340 additional communicates with authentication processing module 345, which has an algorithm based upon the system accuracy using the false reject ratio (FRR) associated with biometric samples provided by the user, as will be described.

A control application programming interface (API) 350 communicates with various applications or programs that the user wishes to access through biometric authentication. As indicated in the drawing, the application(s) may be an application that resides on the device, such as applications APP1, APP2 through APP3 355, or the application(s) may be remote from the device, as in Remote APP1 through APPN 370. Remote applications at a remote location may be accessed by the device over a communication medium, such as applications available on the world wide web (WWW) or Internet.

The processor 330 is operable to compare a biometric sample of the user that is received at the biometric interface to at least one stored template that uniquely identifies the user and thus generate a match score when the biometric sample matches one of the templates stored in storage element 360. The processor compares the match score to a match score threshold value of an application that the user is attempting to access in order to generate match score comparison results.

An updated false reject ratio (FRR) for the last N matches of the user can then be calculated. The processor permits the user to access the application when the match score comparison results indicate that the match score is at least equal to the match score threshold value and the updated FRR is less than a FRR threshold value of the application.

When the updated FRR is greater than the FRR threshold value of the application, the processor of the device determines whether a consecutive number of samples for the user has exceeded a sample number threshold, and when the consecutive number of samples has not exceeded the sample number threshold the biometric interface is operable to receive a next biometric sample of the user, which the processor compares to the biometric template(s); otherwise, the processor controls the authentication interface to allow password authentication of the user at authentication interface 320.

Upon the processor comparing a received biometric sample to a quality threshold and further to one or more stored templates, when the biometric sample does not exceed the quality threshold the processor controls the biometric interface to receive a next biometric sample of the user to compare to the template(s) when the consecutive number of samples provided by the user has not exceeded the sample number threshold.

The match score threshold value may be considered a minimum match score of the application that the user wishes to access. When there is a match between the submitted biometric sample and a template(s) but the match score of the match is not at least equal to the match threshold value, the processor 330 further calculates an updated false reject ratio (FRR) for the last N matches of the user and the processor 330 controls the biometric interface 310 to receive a subsequent biometric sample of the user if the user has not exceeded a permissible sample number threshold; otherwise, the processor controls the authentication interface 120 to provide the user with a password authentication interface that allows the user to perform password authentication.

Figure 5:
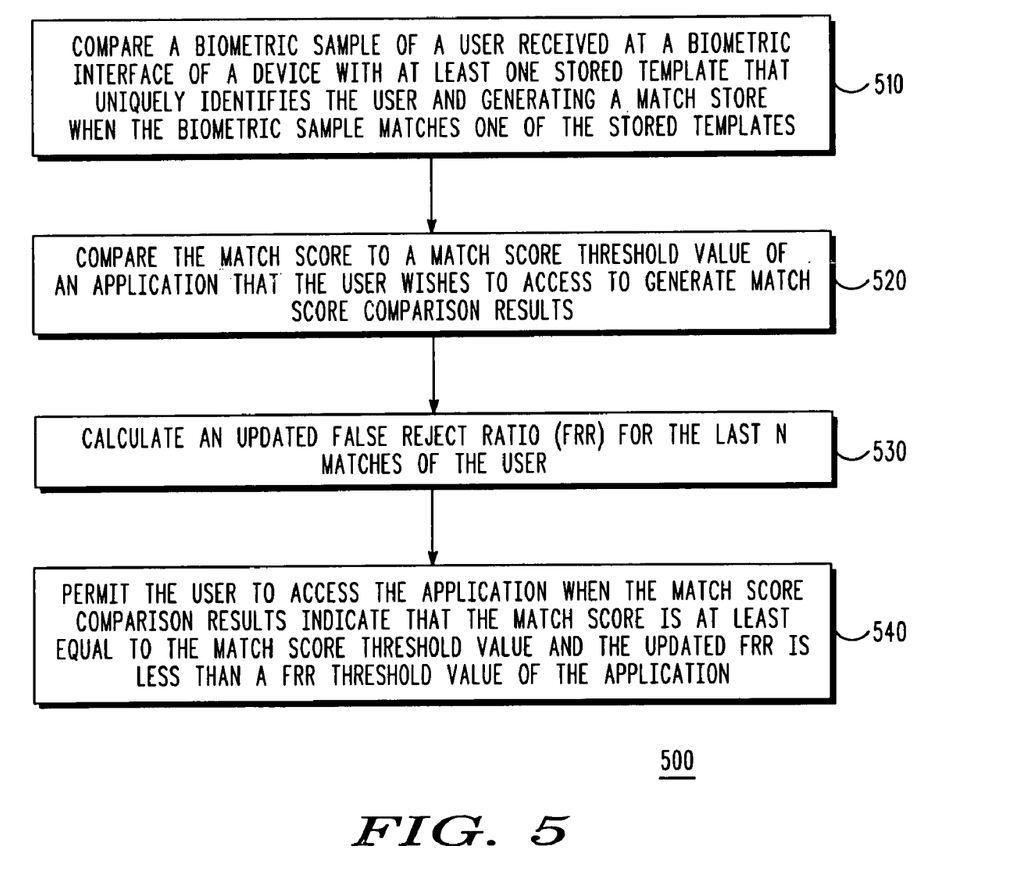
FIG. 5 is a flow diagram illustrating a method of biometric authentication, in accordance with various embodiments.

Turning now to FIG. 5, a flowchart 500 of biometric authentication in accordance with various embodiments is illustrated. At Block 510, a biometric sample of a user received at a biometric interface of a device is compared with at least one stored template that uniquely identifies the user and a match score is generated when the biometric sample matches one of the stored templates. At Block 520, the match score generated in Block 510 is compared to a match score threshold value of an application that the user wishes to access in order to generate match score comparison results. Next, an updated FRR of the user is calculated for the last N matches received from the user at Block 530. The user is permitted to access the application at Block 540 when the match score comparison results indicate that the match score is at least equal to the match score threshold value and the updated FRR is less than a FRR threshold value of the application.

Figure 6:
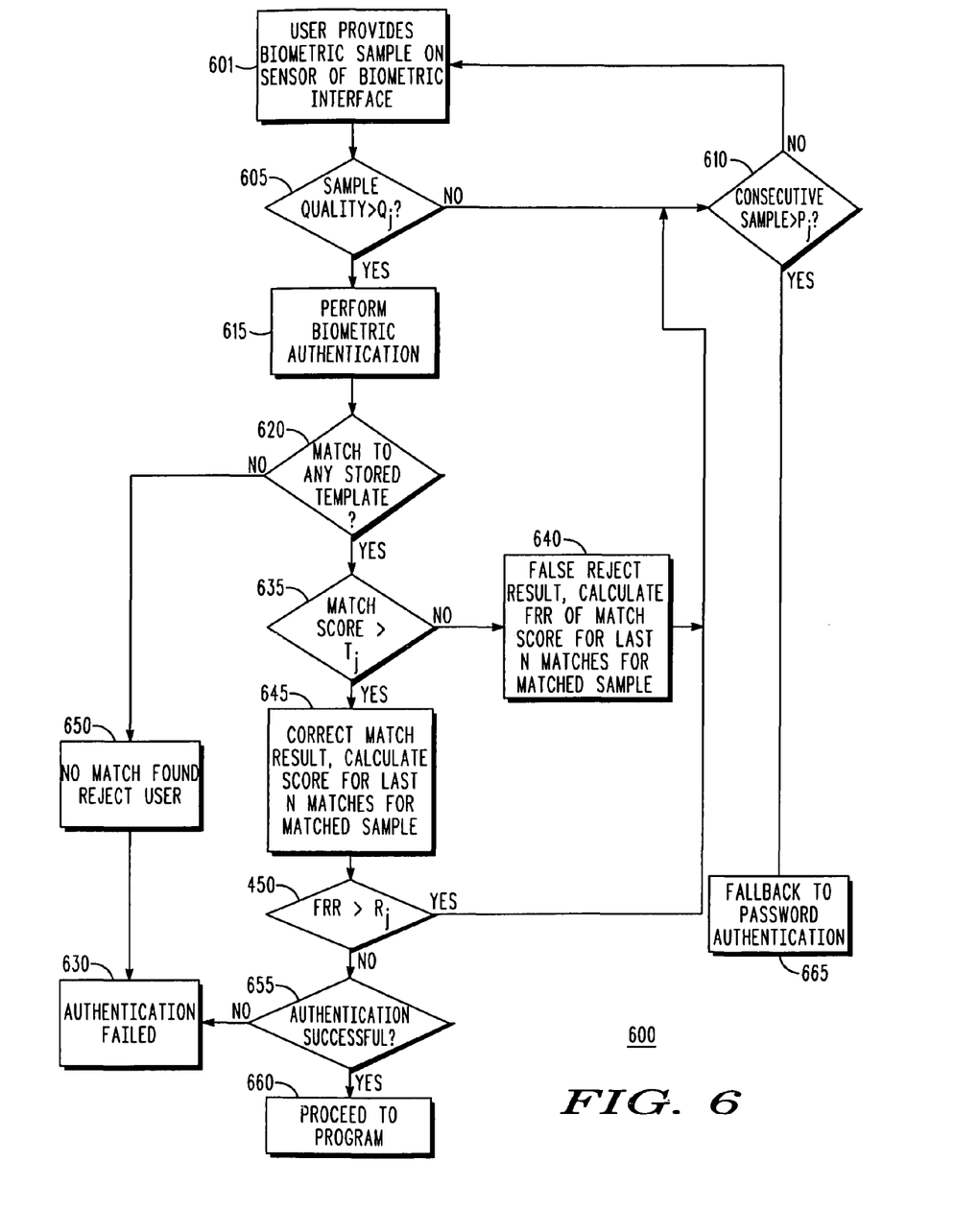
FIG. 6 is a flow diagram illustrating a method of biometric authentication, in accordance with various embodiments.

This is further illustrated by biometric authentication flow diagram 600 of FIG. 6 in accordance with various embodiments. Flow diagram 600 is explained within the context of fingerprint biometric authentication for purposes of illustration; the method is not limited to fingerprint biometrics, as has been previously discussed. At Block 601, the user provides a biometric sample on a sensor of the biometric interface. Within the context of the fingerprint biometric authentication example, the user swipes his finger on the fingerprint sensor. At Decision Block 605, the inquiry is whether the biometric sample received has adequate quality at least equal to quality threshold value Qj for a program or application j that the user is trying to access. The quality threshold value Qj can be variable or constant; for simplicity in this example, we assume it to be constant. If no, then this indicates that the biometric sample provided by the user is not of sufficient quality to proceed with biometric authentication. Bad sample quality could be due to a variety of factors, such as lotion on the finger or the finger being cold and thus its fingerprint being more shriveled than normal. The algorithm will direct the user to provide an additional biometric sample if a permissible number of samples, Pj a sample number threshold, has not been exceeded. Thus, at Decision Block 610, the flow returns to Block 601 if the user's number of biometric samples has not exceeded Pj; otherwise, the flow continues to Block 665 where the user is allowed to engage in an alternative authentication method, such as password authentication at a password authentication interface. By reverting to password authentication, frustration of the user will be lessened. At Decision Block 655, the inquiry is whether the password authentication performed at Block 665 is successful. If no, then the authentication process has failed, Block 630. If yes, then the user is allowed to proceed to the program or application he wished to access.

Returning again to Decision Block 605, if the sample quality is sufficient, then the algorithm proceeds to biometric authentication, Block 615. The inquiry at Decision Block 620 is whether there is a match between the biometric sample provided and any stored template. The image that is captured of the user's fingerprint, to continue with the fingerprint example, is matched against enrolled templates unique to the user. If, no, then the user is rejected at Block 625 and biometric authentication has failed for this user, Block 630. If, yes, however, then the match score generated by matching the biometric sample to a template is compared to a match score threshold value Tj at Decision Block 635. The match score threshold value may be dependent on an application, such as an application to allow the user to make a payment, or dependent on the context in which the application is used. In the case of context affecting the match score threshold value consider that the application could be used in a context requiring a high transaction security, e.g. a high value financial transaction worth millions of dollars, or in a different context requiring a low transaction security, such as a routine, lower amount automatic teller machine (ATM) withdrawal.

If the match score does not exceed Tj, then a false reject result is indicated. An updated FRR for the last N matches of the users is calculated at Block 640. The FRR may be a function of template quality and match score for the last N matches of the user. Thus, the FRR associated with a first sample given by the user would be given as FRR(1)=f(image quality(1),match score) while the FRR associated with a second sample of the same user is given by FRR(2)=f(FRR(1), image quality(2), match score(2)). The FRR of the Nth sample would then be given as FRR(N−1)=f(FRR(N−2),image quality(N), match score(N)). It can be seen that the current FRR value is dependent upon the quality of previous samples. Sample quality data is always being collected and used in the determination of the current FRR in this manner. The flow goes to Block 601 where the user is allowed to provide a consecutive biometric sample if the number of consecutive samples received has not exceeded Pj.

If, however, the match score does exceed Tj, then a correct match result is indicated and an updated false rejection ration (FRR) for the last N matches of the user is calculated at Block 645, in the manner described above in which ongoing data concerning the sample quality provided by the user is used to determine the updated FRR. An initial FRR value may be calculated based on the first sample, i.e. fingerprint swipe, provided by the user and a look-up table, or it may be calculated during the user enrollment process in which the user enrolls his biometric sample. In calculating the updated FRR, older matches that are older than the N matches are dropped to reflect continuous improvement by the user in providing biometric samples.

The updated FRR is then compared to an FRR threshold value Rj; Rj refers to the FRR needed for the user to be able to access a particular program j. If the updated FRR is greater than Rj, the flow goes to Block 610. If, however, FRR is not greater than Rj, the inquiry at Block 655 is whether authentication is successful. If yes, the user can proceed to the application or program at Block 660. If authentication was not successful, then the biometric authentication process has failed, Block 630. As used herein the parameters FRR, FAR, j, Qj, Pj, Tj, N, and Rj of the biometric authentication algorithm may be set as needed, either by the application j the user is attempting to access, by the issuer/control of a particular program, such as a credit card company, or at the factory where the application or device is manufactured.

The various embodiments describe herein provide customized biometric authentication that is based at least in part upon usage history and learning capabilities of a user, thereby addressing shortcomings of past and present biometric authentication techniques and/or mechanisms. Customized levels of security based upon the needed security level of an application may be achieved. User frustration will be less, while maintaining the security level, as reflected in the FRR, needed by a particular application. Customized FRR is based on dynamic updates of ongoing samples provided by a particular user and not on statistic results calculated from stale user samples or a construct independent of the user. This allows the user the flexibility of good sample days and bad sample days while still requiring the user to practice correct sample mechanics. It also is forgiving if the user forgets which biometric sample, such as which finger, is to be used for a particular application.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processor" or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for biometric authentication described herein. The non-processor circuits may include, but are not limited to, a radio receiver, a radio transmitter, signal drivers, clock circuits, power source circuits, and user input devices. As such, these functions may be interpreted as steps of a method to perform the biometric authentication described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of dynamically setting a security level of biometric authentication, comprising:
   receiving a biometric sample of a user at a biometric interface of a device as part of a biometric authentication request by the user, wherein the biometric sample is provided by the user in an attempt to access an application, and wherein the biometric sample is characterized by a match score when the biometric sample matches at least one stored template that uniquely identifies the user;
   detecting a presence of a historical usage override condition of a usage pattern by the user of the biometric authentication request, wherein the historical usage override condition comprises an updated false reject ratio (FRR) for the last N matches of a plurality of biometric samples supplied by the user;
   detecting a presence of a generic usage override condition comprising at least one of a location based condition, a time of day condition, a humidity condition, an ambient light condition, a temperature condition, or a user motion of usage of the device,
   updating a context usage factor based upon the historical usage override condition and the generic usage override condition;
   calculating a biometric recognition threshold required for the user to access the application based on the updated context usage factor, wherein the biometric recognition threshold determines a threshold security level required for biometric authentication;
   comparing the biometric sample of the user received at the biometric interface with at least one stored template that uniquely identifies the user and generating the match score when the biometric sample matches the at least one stored template;
   comparing the match score to the biometric recognition threshold to generate match score comparison results, and calculating the updated FRR; and
   permitting the user to access the application when the match score comparison results indicate that the match score is at least equal to the biometric recognition threshold and the updated FRR is less than a FRR threshold value of the application.

2. The method of claim 1, wherein when the updated FRR is greater than the FRR threshold value of the application, the method further comprising:
   determining whether a consecutive number of biometric samples for the user has exceeded a sample number threshold; and
   when the consecutive number of biometric samples has not exceeded the sample number threshold, receiving a next biometric sample of the user at the biometric interface to compare to the at least one stored template, otherwise performing an alternative authentication method.

3. The method of claim 1, further comprising detecting an amount of a transaction that affects the biometric recognition threshold.

4. The method of claim 1, further comprising detecting an application usage override condition comprising a device location, a terminal location, a facility in which the terminal is housed, or application specific parameters.

5. The method of claim 1, wherein the biometric sample is a fingerprint sample.

6. A device operable in a system having a biometric authentication that can be dynamically set, comprising:
   a biometric interface operable to receive a biometric sample of a user provided by the user in an attempt to access an application and in operational communication with a processor, wherein the biometric sample is characterized by a match score when the biometric sample matches at least one stored template that uniquely identifies the user;
   a processor comprising:
   a context aware module of the processor that detects a presence of a historical usage override condition and a generic usage override condition; and
   wherein the historical usage override condition comprises an updated false reject ratio (FRR) for the last N matches of a plurality of biometric samples supplied by the user;
   wherein the generic usage override condition comprises at least one of a location based condition, a time of day condition, a humidity condition, an ambient light condition, a temperature condition, or a user motion of usage of the device,
   a dynamic threshold setting module of the processor that updates a context usage factor based upon the historical usage override condition and the generic usage override condition and calculates a biometric recognition threshold required for the user to access the application based on the context usage factor, wherein the biometric recognition threshold determines a threshold security level required for biometric authentication;
   wherein the user of the device is permitted to access the application when the match score of the biometric sample is at least equal to the biometric recognition threshold;
   wherein the processor compares the biometric sample of the user received at the biometric interface with at least one stored template that uniquely identifies the user and generates the match score when the biometric sample matches one of the stored templates;
   wherein the processor compares the match score to the biometric recognition threshold to generate match score comparison results and calculates an updated false reject ratio (FRR) for the last N matches of the user, and permits the user to access the application when the match score comparison results indicate that the match score is at least equal to the biometric recognition threshold value and the updated FRR is less than a FRR threshold value of the application.

7. The device of claim 6, wherein the device further comprises a storage element coupled to the processor, and the one or more user templates are stored in the storage element.

8. The device of claim 6, wherein the biometric interface comprises a fingerprint sensor.

9. A non-transitory computer-readable storage element having computer readable code stored thereon for programming a computer to perform a method for biometric authentication, the method comprising:
   receiving a biometric sample of a user at a biometric interface of a device as part of a biometric authentication request by the user, wherein the biometric sample is provided by the user in an attempt to access an application, and wherein the biometric sample is characterized by a match score when the biometric sample matches at least one stored template that uniquely identifies the user;

detecting a presence of a historical usage override condition of a usage pattern by the user of the biometric authentication request, wherein the historical usage override condition comprises an updated false reject ratio (FRR) for the last N matches of a plurality of biometric samples supplied by the user;

detecting a presence of a generic usage override condition comprising at least one of a location based condition, a time of day condition, a humidity condition, an ambient light condition, a temperature condition, or a user motion of usage of the device, updating a context usage factor based upon the historical usage override condition and the generic usage override condition;

calculating a biometric recognition threshold required for the user to access the application based on the updated context usage factor, wherein the biometric recognition threshold determines a threshold security level required for biometric authentication;

comparing the biometric sample of the user received at the biometric interface with at least one stored template that uniquely identifies the user and generating the match score when the biometric sample matches the at least one stored template;

comparing the match score to the biometric recognition threshold to generate match score comparison results, and calculating the updated FRR; and permitting the user to access the application when the match score comparison results indicate that the match score is at least equal to the biometric recognition threshold and the updated FRR is less than a FRR threshold value of the application.

10. The non-transitory computer-readable storage element of claim 9, wherein when the updated FRR is greater than the FRR threshold value of the application, the method further comprising:

determining whether a consecutive number of biometric samples for the user has exceeded a sample number threshold; and when the consecutive number of biometric samples has not exceeded the sample number threshold, receiving a next biometric sample of the user at the biometric interface to compare to the at least one template, otherwise performing an alternative authentication method.

11. The non-transitory computer-readable storage element of claim 9, wherein the biometric sample is at least one of a fingerprint swipe provided by the user at the biometric interface or a fingerprint scan provided by the user at the biometric interface.

12. The non-transitory computer-readable storage element of claim 9, having further code for detecting a presence of an application usage override condition comprising a device location, a terminal location, a facility in which the terminal is housed, or application specific parameters.

* * * * *